United States Patent [19]

Wong et al.

[11] Patent Number: 5,510,127
[45] Date of Patent: Apr. 23, 1996

[54] PROCESS FOR MAKING BREAD IN AN AUTOMATIC BREAD MAKER

[75] Inventors: John Wong, Hong Kong; Raymond Sze, Estoril Court, both of Hong Kong; Thomas H. Tompkins, Shreveport, La.; Randall S. Ward, Hattiesburg, Miss.

[73] Assignees: Raymond Industrial Ltd., Kowloon, Hong Kong; Sunbeam Corporation, Ft. Lauderdale, Fla.

[21] Appl. No.: 372,111

[22] Filed: Jan. 13, 1995

[51] Int. Cl.$^6$ .............................. A21D 6/00; A21D 8/00
[52] U.S. Cl. ................ 426/19; 426/27; 426/523
[58] Field of Search ................ 426/19, 27, 519, 426/523, 549

[56] References Cited

U.S. PATENT DOCUMENTS

| | | | |
|---|---|---|---|
| D. 310,615 | 9/1990 | Kitai et al. | D7/348 |
| D. 311,848 | 11/1990 | Mikami et al. | D7/348 |
| D. 325,147 | 4/1992 | Watanabe et al. | D7/354 |
| 4,234,605 | 11/1980 | Takeuchi | 426/18 |
| 4,415,799 | 11/1983 | Tanaka et al. | 219/400 |
| 4,538,509 | 9/1985 | Ojima et al. | 99/348 |
| 4,762,057 | 8/1988 | Hirota et al. | 99/348 |
| 4,776,265 | 10/1988 | Ojima | 99/348 |
| 4,803,086 | 2/1989 | Hedenberg | 426/87 |
| 4,844,048 | 7/1989 | Aruga et al. | 126/21 R |
| 4,885,176 | 12/1989 | Nakakura et al. | 426/19 |
| 4,903,587 | 2/1990 | Nagasaka et al. | 99/325 |
| 4,903,588 | 2/1990 | Horiuchi et al. | 99/348 |
| 4,903,589 | 2/1990 | Aoyama | 99/348 |
| 4,930,899 | 6/1990 | Aoyama | 366/98 |
| 4,951,559 | 8/1990 | Arao et al. | 99/348 |
| 4,957,040 | 9/1990 | Nakakura et al. | 99/348 |
| 4,977,822 | 12/1990 | Seo et al. | 99/348 |
| 4,984,512 | 1/1991 | Takahashi et al. | 99/327 |
| 5,030,466 | 7/1991 | Kageyama et al. | 426/27 |
| 5,076,153 | 12/1991 | Takahashi et al. | 99/327 |

*Primary Examiner*—George Yeung
*Attorney, Agent, or Firm*—Marshall, O'Toole, Gerstein, Murray & Borun

[57] ABSTRACT

Bread is produced in a bread maker by first mixing/kneading the bread ingredients into a dough, allowing the dough to rest and then kneading the dough for a second cycle. During both kneading cycles, a motor driving a kneading blade is repeatedly bi-directionally rotated with intermittent pulses to give a randomness to the flight of the dough. After kneading, the dough is fermented during a first rise cycle. Next, the dough is preheated and degassed before it is fermented for a second rise cycle. After rising, the dough is baked at a high temperature for proper browning of the crust and then the temperature is lowered to complete the baking of the bread. Lastly, the bread is cooled at a gradual rate by intermittently actuating a heater and a fan.

37 Claims, 6 Drawing Sheets

|  | White Bread (Light Crust) | | White Bread (Medium Crust) | | White Bread (Dark Crust) | | Wheat Bread | | French Bread | | Sweet Bread | |
| --- | --- | --- | --- | --- | --- | --- | --- | --- | --- | --- | --- | --- |
|  | Time (min.) | Temp (°C) | Time (min.) | Temp (°C) | Time (min.) | Temp (°C) | Time (min.) | Temp (°C) | Time (min.) | Temp (°C) | Time (min.) | Temp (°C) |
| Knead 1 | 15 |  | 15 |  | 15 |  | 15 |  | 15 |  | 15 |  |
| Rest | 5 | 28-29 | 5 | 28-29 | 5 | 28-29 | 10 | 28-29 | 5 | 23-24 | 5 | 28-29 |
| Knead 2 | 10 |  | 10 |  | 10 |  | 5 |  | 15 |  | 10 |  |
| Rise 1 | 80 | 29-30 | 80 | 29-30 | 80 | 29-30 | 95 | 29-30 | 75 | 23-24 | 65 | 29-30 |
| Gas 1 | 0.33 |  | 0.33 |  | 0.33 |  | 0.42 |  | 0.50 |  | 0.33 |  |
| Rise 2 | 60 | 33-34 | 60 | 33-34 | 60 | 33-34 | 70 | 33-34 | 100 | 33-34 | 60 | 33-34 |
| Bake 1 | 20 | 175-186 | 25 | 175-186 | 35 | 175-186 | 0 | 175-186 | 25 | 175-186 | 25 | 175-186 |
| Bake 2 | 15 | 145-155 | 15 | 145-155 | 15 | 145-155 | 40 | 145-155 | 30 | 145-155 | 15 | 145-155 |

FIG. 7

PROCESS FOR MAKING BREAD IN AN AUTOMATIC BREAD MAKER

FIELD OF THE INVENTION

The present invention relates generally to bread making, and more particularly to a process for making bread in a bread maker which automatically controls all steps of the process, including kneading, rising, baking and cooling.

BACKGROUND ART

The process for making bread at home is time consuming and involves considerable skill. Yeast, sugars, flour, liquids and salt have to be combined in proper proportions to form a dough, which then has to be repeatedly kneaded and allowed to rise for precise periods of time. The dough then has to be baked and cooled. This process takes many hours to complete and involves careful monitoring of time and temperature. Therefore, it is normally difficult for inexperienced people to make bread successfully at home.

Automatic bread making machines were developed to simplify the process of making bread at home. Generally, bread makers are self-contained units consisting of a kneading/baking chamber, a motor driving a kneading blade, a heating unit, a fan and a control unit to drive the various electrical and mechanical components.

Processes for making bread in a bread-maker are disclosed, for example, in Nakakura, et al., U.S. Pat. No. 4,885,176 and Horiuchi, et al., U.S. Pat. No. 4,903,588. Generally, a user adds raw bread ingredients to the kneading/baking chamber of the bread maker and then inputs instructions to a control panel to specify the size, type etc. of bread being made. The control unit includes a microprocessor and uses these instructions to select the parameters required to produce the bread. The ingredients are first mixed into a dough and kneaded by actuating a motor to rotate the kneading blade within the baking chamber. Next, the dough is fermented and degassed, usually for several cycles, and then baked. When baking is completed, the user either removes the bread from the machine for cooling or the heater is deactivated and the bread cools inside the machine.

While bread makers have greatly simplified the process for making bread at home, the resulting bread can be of inferior quality due to shortcomings in the processes used by the bread makers. For example, the kneading/baking chamber in a bread maker is generally square or rectangular. During mixing and kneading, ingredients can be lodged into the corners of the chamber by the constant force of the kneading blade and will not be properly incorporated into the dough. Also, the simple cyclic rotational movement of the kneading blade within the chamber does not provide for the randomness and thoroughness of hand kneading. In other words, a portion of the dough sticks to or "floats" on the kneading blade, resulting in an inconsistent dough that will not produce optimum quality bread with a fine cell structure.

Temperature control within the bread maker may also affect the quality of the bread. For example, if the temperature is too low after fermentation or rising, the dough will not properly release gas during degassing and the texture and height of the resulting bread may suffer. Further, since bread makers are relatively compact, the heating element must be placed within close proximity of the baking chamber, making it difficult to consistently ensure good crust browning and even inside cooking using a conventional single temperature bake cycle. Also, if the user does not promptly remove the bread after baking is complete and the heater is deactivated, steam produced in the baking chamber may condense back into the bread, impairing both its appearance and taste.

Various other patents propose bread makers in an attempt to overcome these and other problems. For example, Ojima, et al., U.S. Pat. No. 4,538,509 and Hirota, et al., U.S. Pat. No. 4,762,057, disclose bread makers with an insulated water tank separate from the kneading/baking chamber. The temperature of the water added to the tank is used to regulate the temperature inside the machine. Ojima, U.S. Pat. No. 4,776,265 and Nakakura, et al., U.S. Pat. No. 4,885,176, disclose bread-makers with a separate yeast-adding device. While these features may contribute to improving the quality of bread produced, they also introduce additional electrical and mechanical elements and complicate the control processes of the machines. Thus, the machines are bulkier and more expensive to manufacture. Further, forcing the user to add ingredients such as yeast and water separately complicates the use of the machine.

Thus, there remains a need for an improved process to enable an automatic bread maker to consistently produce high quality bread without introducing additional complex elements to the machine or the user.

SUMMARY OF THE INVENTION

In accordance with the present invention, bread is made in a bread maker having a motor driving a kneading blade, a heater and a fan by first combining bread ingredients into a dough. Next, the motor is actuated with intermittent pulses to knead the dough during a first knead cycle and then deactuated to allow the dough to soften and absorb moisture. The motor is then actuated with intermittent pulses during a second kneading cycle. The fan is also actuated during the second knead cycle to drive out any sour smells or vapor in the dough. During each of the kneading cycles, the motor is repeatedly rotated in one direction with an intermittent pulse, stopped for a short period of time, and then rotated in the opposite direction with an intermittent pulse.

After kneading is completed, the dough is fermented during a first rise cycle, degassed and fermented again during a second rise cycle. Next, the heater is actuated to bake the bread at a temperature for a variable period of time corresponding to a desired bread crust color during a first bake cycle. The temperature is then lowered to complete baking of the bread during a second bake cycle. Upon completion of baking, the bread is gradually cooled.

According to another aspect of the present invention, the dough is preheated to a predetermined temperature after the first rise cycle and before degassing. This preheating gives the dough the tenderness required for proper degassing to facilitate high rising during the second rise cycle and refined texture and cell structure after baking.

According to yet another aspect of the present invention, the rate of cooling of the bread after baking is controlled by intermittently actuating the heater and the fan within the bread maker. This controlled cooling allows the moisture inside of the bread and the baking chamber to be expelled to prevent soggy texture and an impaired appearance in the finished bread.

BRIEF DESCRIPTION OF THE DRAWINGS

FIG. 7 is a time/temperature chart for the process for making various types of bread in the bread maker.

DESCRIPTION OF THE PREFERRED EMBODIMENT

Figure 1:
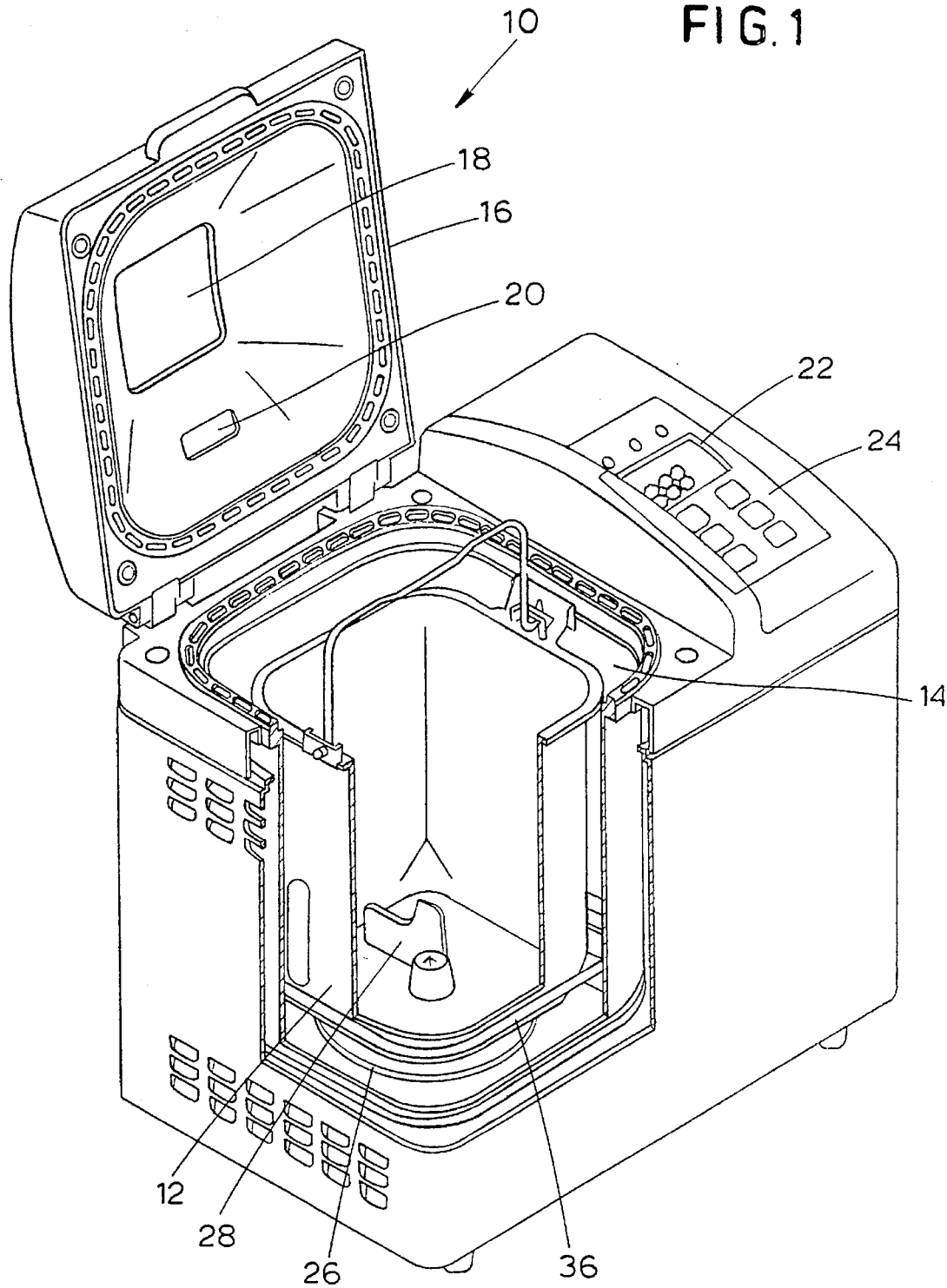
FIG. 1 is a partially cut-away perspective view of the bread maker of the present invention.
Figure 3:
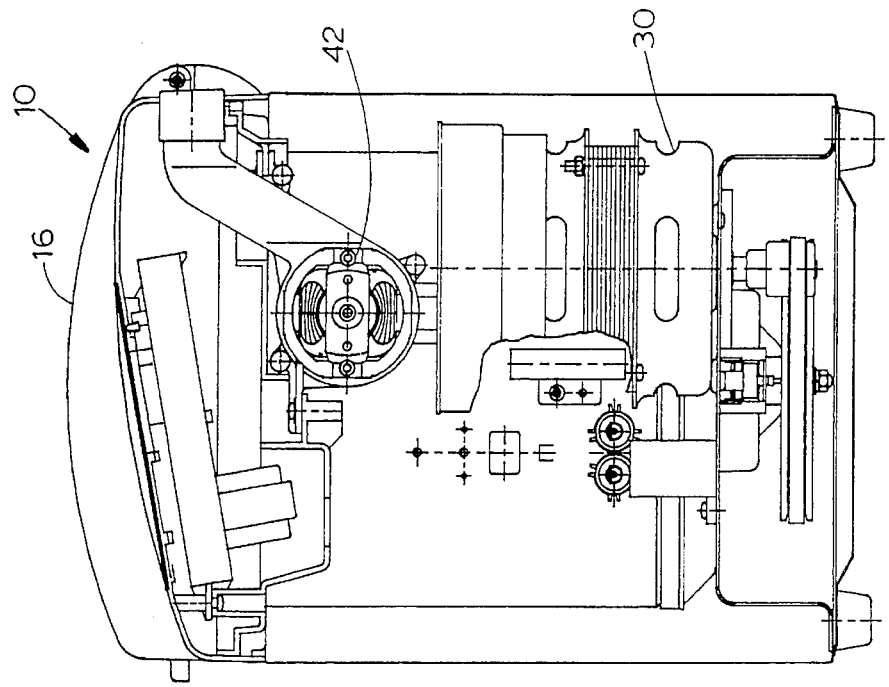
FIG. 3 is a schematic right side view of the bread maker of FIG. 1 illustrating several interior components.
Figure 2:
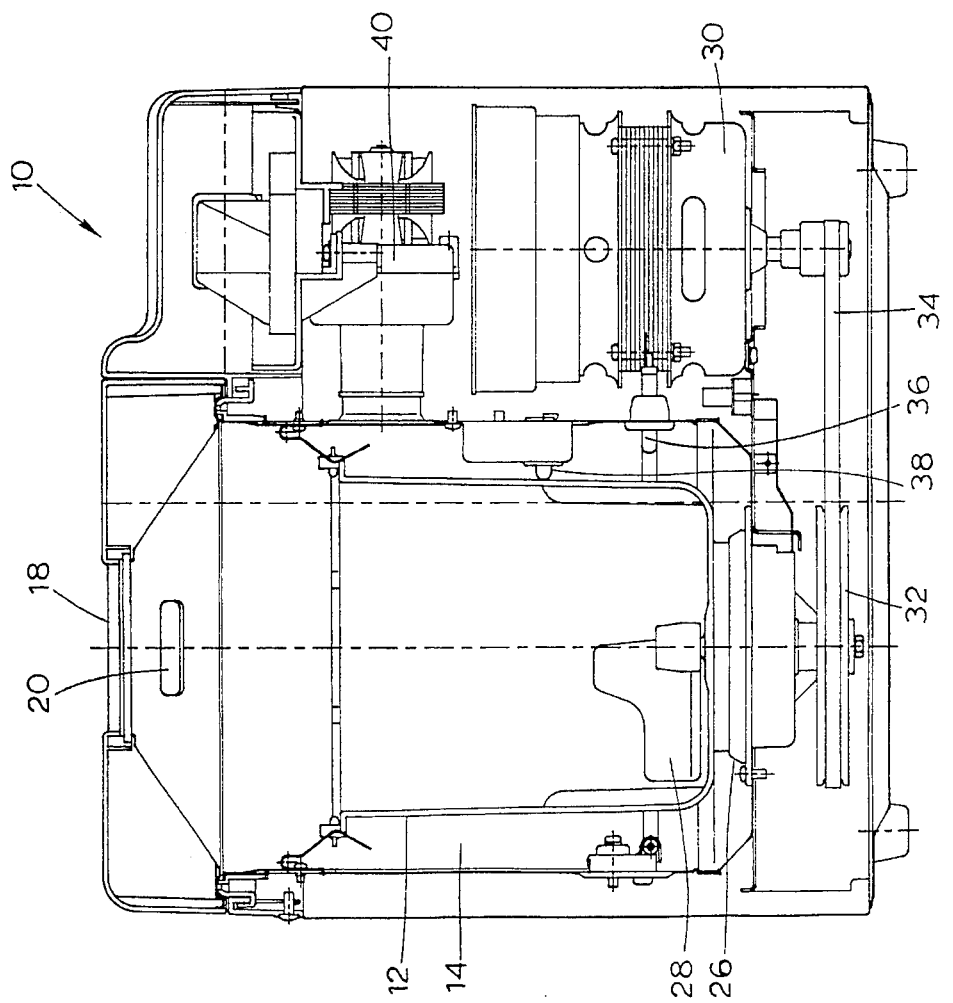
FIG. 2 is a schematic front view of the bread maker of FIG. 1 illustrating several interior components.

Referring to FIGS. 1–3, a bread maker 10 comprises a removable bread pan 12 inside a baking chamber 14. A hinged lid 16 containing a viewing window 18 and a steam vent 20 is attached to the top of the bread maker 10 to provide access to the bread pan 12 and baking chamber 14. An LCD display 22 and control panel 24 are located on top of the bread maker 10 adjacent to the lid 16.

A drive shaft 26 of a kneading blade 28 on the inside of the bread pan 12 is coupled to an induction motor 30 by a pulley 32 and belt 34. Thus, the motor 30 drives the rotation of the kneading blade 28 within the bread pan 12.

A heating element 36 located inside the baking chamber 14 encircles the bottom perimeter of the bread pan 12. A temperature sensor 38 located inside the baking chamber 14 contacts the outside of the bread pan 12 when the bread pan 12 is inserted into the baking chamber 14. A fan 40 located near the top of the baking chamber is driven by a motor 42. When the motor 42 is actuated, the fan 40 draws air out of the baking chamber.

A control unit 44 with a microprocessor receives information regarding the type, size, and desired crust color of the bread to be made from the user via the control panel 24. The user may also select a rapid mode to decrease the overall completion time for the bread or a delay mode so the bread maker will complete the bread at a preset time in the future. The control unit 44 uses this information to select a preprogrammed cycle to control operation of the kneading blade 28, the heating element 36 and the fan 40. During operation, the control unit also receives information from the temperature sensor 38 to control the heating element 36 and/or the fan 40 to maintain the desired temperatures within the baking chamber 14.

Figure 4:
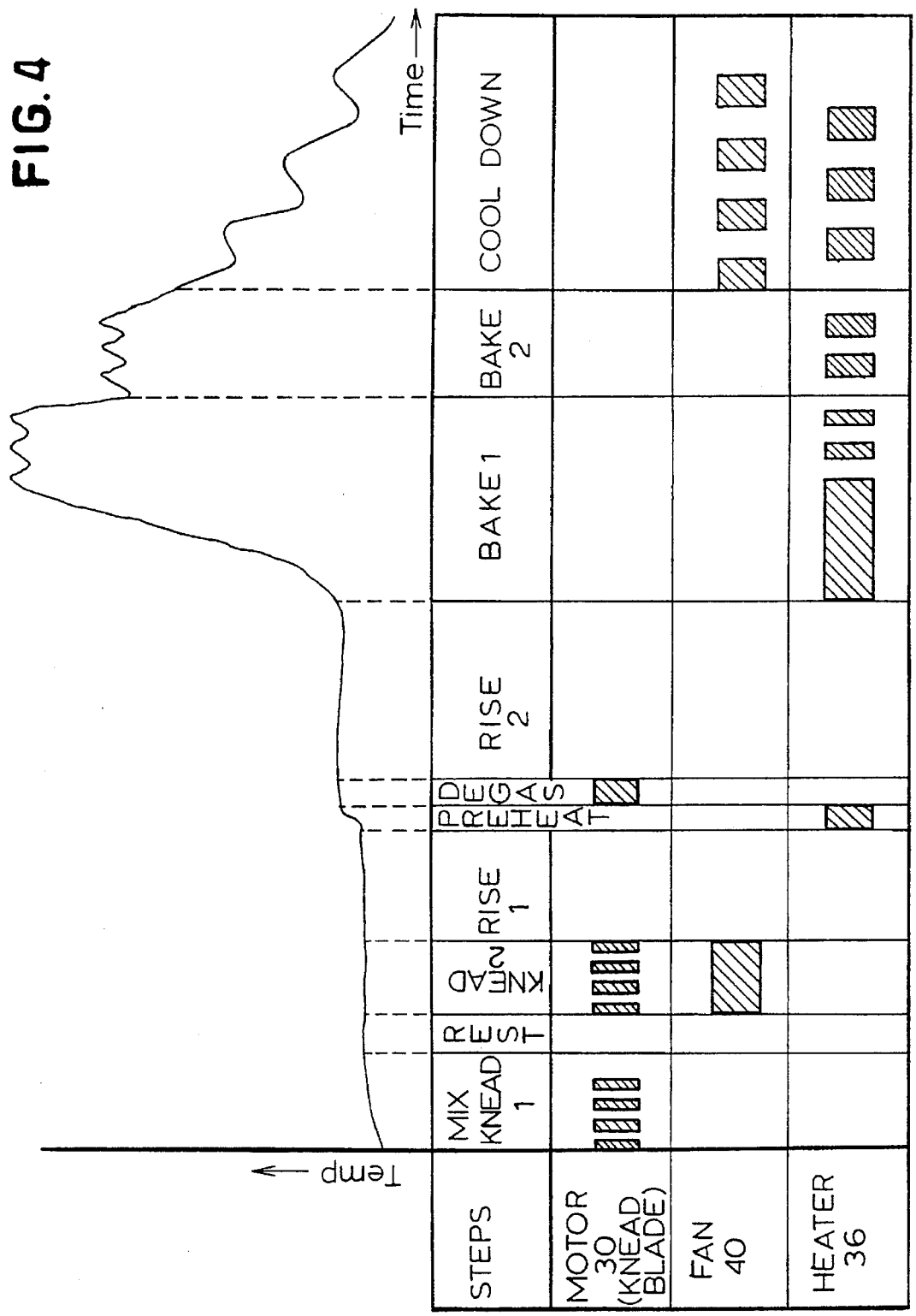
FIG. 4 is a chart illustrating the process for making bread in the bread maker according to the present invention.

The chart of FIG. 4 illustrates the process of the present invention for making bread in the automatic bread maker 10 described above. The user inputs the bread ingredients, such as flour, sugar, liquids, yeast, salt and fats, into the bread pan 12 which is then inserted into the baking chamber 14. The liquid ingredients are added first, followed by the dry ingredients. Preferably, the yeast is placed in a small hole dug inside the dry ingredients, which prevents the yeast from contacting the liquids and activating too soon.

The user then selects the type of bread (white, wheat, french or sweet) and crust color (light, medium or dark) desired via the control panel 24. The user also selects either a small (1 pound) or large (1.5 pound) loaf. Further, the user may select the rapid mode to decrease completion time or the delay mode to delay completion time for up to 13 hours. The control panel 24 also displays the amount of time until the bread is finished baking and indicates what stage of the process the bread maker is performing (i.e. knead, rise, bake or cool).

Figure 5:
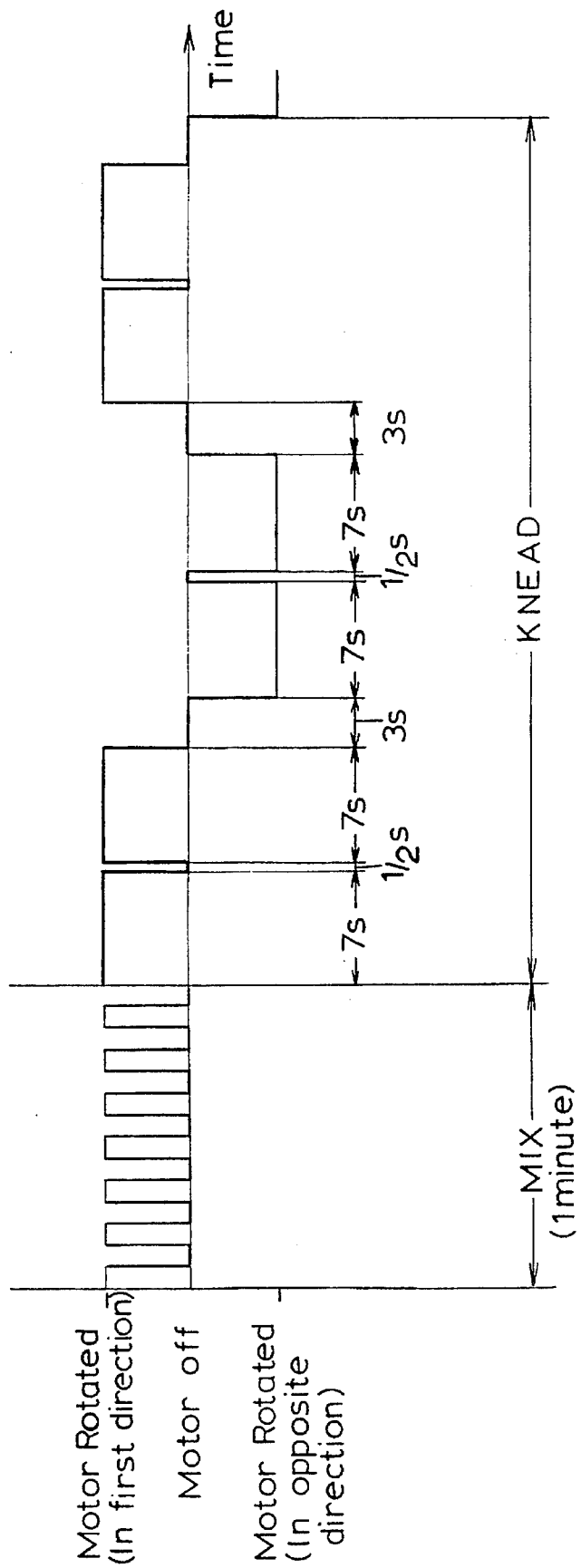
FIG. 5 is a timing diagram illustrating the operation of the motor driving the kneading blade during the kneading cycle of the bread making process.

The first step in the bread making process is the mix/knead cycle, as shown in the timing diagram of FIG. 5. The motor 30 is pulse-actuated to rotate the kneading blade 28 within the bread pan 12. During the initial mixing, the motor 30 is repetitively pulsed in one direction for approximately one minute. The initial unidirectional pulse rotation prevents the dry ingredients from being scattered outside of the bread pan 12 before they are sufficiently combined with the liquid ingredients to form a dough.

Following the initial mixing, the motor 30 is rotated in one direction with a short intermittent pulse, stopped for a short time, and then rotated in the opposite direction with a short intermittent pulse. Generally, the motor 30 is rotated for 7 seconds in one direction, stopped for ½ second and then rotated in the same direction for another 7 seconds. The motor 30 is then stopped for 3 seconds, rotated for 7 seconds in the opposite direction, stopped for ½ second and then rotated for another 7 seconds. This cycle is repeated for the duration of the first knead cycle, which lasts approximately 15 minutes.

The short ½ second pulse between the unidirectional kneading provides an unbalanced motion so the dough will not stick to or "float" on the kneading blade 28. The randomness induced by the intermittent pulse more closely approximates hand kneading than a continuous rotation, and produces bread with a better, softer cell structure.

After completion of the first knead cycle, the motor 30 is deactuated and the dough is allowed to rest for approximately 5 minutes within the bread pan 12. This rest cycle allows the dough to soften and absorb moisture and also stabilizes the temperature of the different bread ingredients constituting the dough and greatly improves the texture of the finished bread.

Next, the motor 30 is again actuated for the second knead cycle. Like in the first knead cycle, the motor 30 is repeatedly rotated with an intermittent pulse in both directions and a rest in between. The motor 42 is also actuated to drive the fan 40 to draw air from the baking chamber 14. The fan 40 drives sour smells or vapors out of the baking chamber 14 and also ensures that the temperature of the dough will not rise too high due to the friction during kneading.

The dough is then allowed to ferment and rise within the bread pan 12 for approximately an hour. This first rise cycle allows the yeast to properly activate within the dough.

In the next step, the heating element 36 is briefly actuated to preheat the dough to the proper temperature for the subsequent degassing step. During degassing, the motor 30 is actuated in one direction and then actuated in the other direction for a total time of approximately 30 seconds, depending on the type of bread being made. Preferably, the motor 30 is not pulsed during degassing. Preheating before degassing is essential because it gives the dough the tenderness it needs for proper gas release to ensure a high rise during the second rise cycle and a well refined cell structure and texture without large air pockets after baking. Preheating is especially important when making french bread because the dough is maintained at a low temperature during the first rise.

After degassing is completed, the dough is allowed to ferment and rise for approximately one hour during a second rise cycle. Then, the heating element 36 is actuated to raise the temperature in the baking chamber 14 for the first bake cycle to approximately 180° C. The temperature sensor 38 provides information to the control unit 44 to actuate and deactuate the heating element 36 as necessary to maintain the temperature in a preprogrammed range for the duration of the cycle.

The length of the first bake cycle is determined by the crust color (light, medium or dark) the user initially input to the control panel 24. Since the first bake cycle temperature is relatively high, it effectively and efficiently browns the outside crust of the bread. Thus, when a dark crust is desired, the first bake cycle will be longer than for a lighter crust. In general, the first bake cycles lasts between 20 and 35 minutes, depending on the type of bread being made.

Next, the heating element 36 is deactuated to lower the temperature in the baking chamber 14 to approximately 150° C. for the second bake cycle. As in the first bake cycle, the temperature sensor 38 and the control unit 44 regulate the heating element 36 to maintain the desired temperature throughout the cycle. This second, lower temperature bake cycle bakes the inside of the bread without further browning of the crust. Thus, the combination of the two bake cycles alleviates the problem of bread that is burned on the outside and/or undercooked in the middle.

Upon completion of the second bake cycle, the bread maker 10 will alert the user by a series of beeps that the bread is ready to be removed for cooling. If the user is not present to remove the bread, the bread is cooled inside the machine. During cool down, the motor 42 is intermittently actuated to drive the fan 40 to reduce the temperature by drawing the warm air out of the baking chamber 14. However, if the bread is cooled too quickly, moisture generated inside the bread and the baking chamber 14 will not be thoroughly expelled, resulting in a soggy texture and an impaired appearance of the finished bread. Therefore, the heating element 36 is also intermittently actuated to control the rate of cooling within the baking chamber 14.

Figure 6:
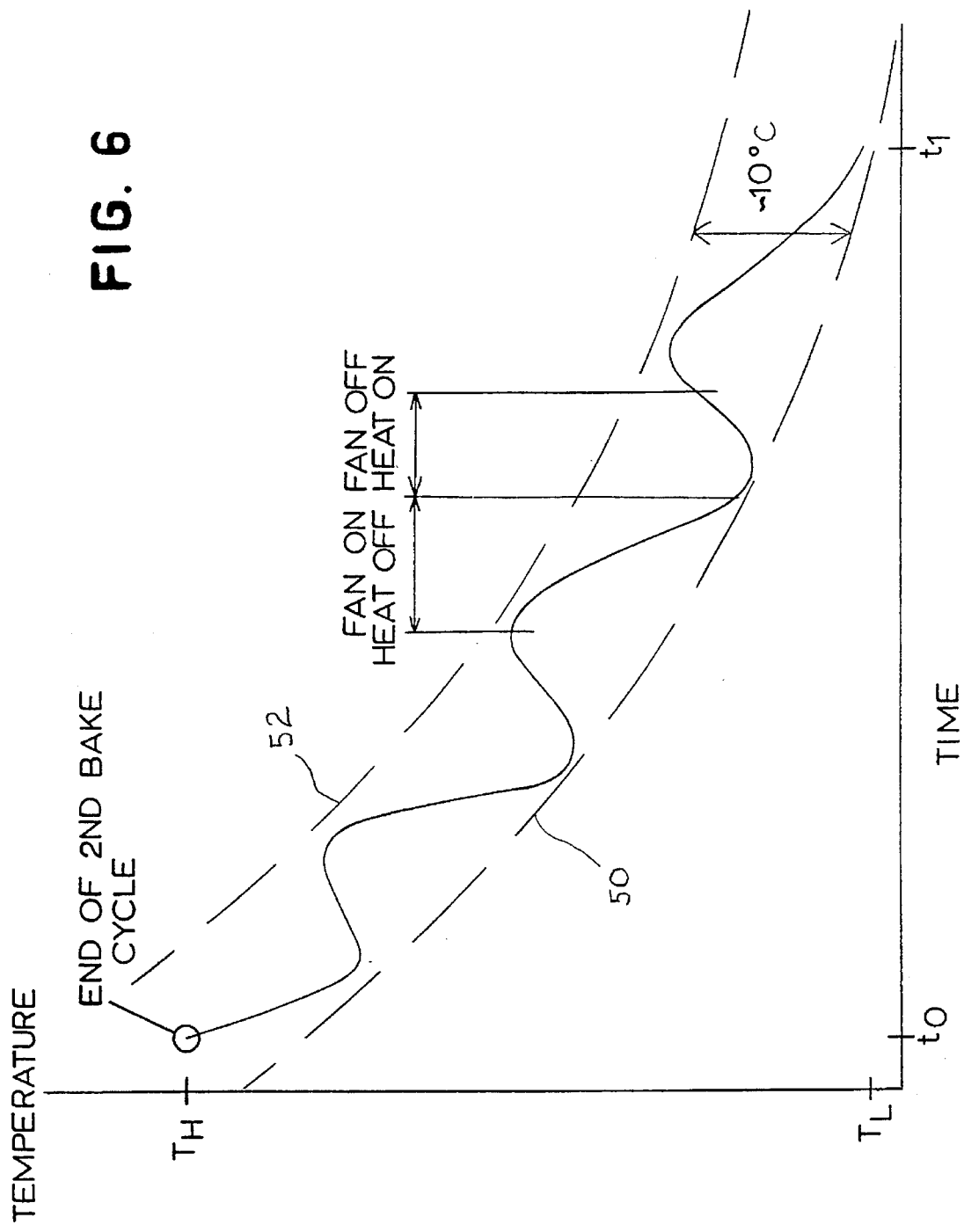
FIG. 6 is a chart illustrating the cooling cycle of the bread making process.

FIG. 6 illustrates the cooling curve followed by the bread maker 10. At the end of the second bake cycle, the temperature of the bread in the baking chamber 14 is approximately 150°–160° C. ($T_H$). The heating element 36 is deactuated and the motor 42 is actuated to drive the fan 40 to reduce this temperature. The temperature sensor 38 continually monitors the temperature in the chamber 14 during the cooling cycle. Once the temperature approaches a lower limit 50, the control unit 44 deactuates the fan 40 and reactuates the heating element 36 to slow the rate of cooling. Similarly, the heating element 36 remains on until the temperature approaches an upper limit 52. The difference in temperature between the upper limit 52 and the lower limit 50 is approximately 10° C.

The heating element 36 and fan 40 are intermittently actuated to maintain the temperature in the baking chamber 14 between the upper limit 52 and the lower limit 50 for 30 minutes, at the end of which the bread in the baking chamber 14 reaches approximately room temperature. Once the 30 minute cooling cycle is over, both the heating element 36 and the fan 40 are deactuated and the bread making process is complete.

Specific examples of the time and temperatures used by the bread maker 10 during the bread making process to produce various types of bread are illustrated in the chart of FIG. 7.

While a particular embodiment of the present invention has been shown and described, modifications may be made, and it is therefore intended to cover all such changes and modifications as fall within the true spirit and scope of the invention.

It is claimed:

1. A method for making bread from bread ingredients in a bread maker having a motor driving a kneading blade, a heater and a fan, comprising the sequential steps of:
    (a) combining the bread ingredients into a dough;
    (b) actuating the motor with intermittent pulses for kneading the dough during a first knead cycle;
    (c) deactuating the motor for allowing the dough to rest;
    (d) actuating the motor with intermittent pulses for kneading the dough during a second knead cycle;
    (e) fermenting the dough during a first rise cycle;
    (f) degassing the dough;
    (g) fermenting the dough during a second rise cycle;
    (h) baking the bread at a predetermined first bake temperature during a first bake cycle extending for a variable period of time corresponding to a desired bread crust color;
    (i) baking the bread at a temperature lower than the first bake temperature during a second bake cycle;
    (j) gradually cooling the bread from the second bake cycle temperature.

2. The method of claim 1, wherein the combining of bread ingredients of step (a) includes repeatedly pulse-actuating the motor.

3. The method of claim 1, wherein the kneading of steps (b) and (d) includes repeatedly rotating the motor, driving the kneading blade in a first direction with an intermittent pulse, deactuating the motor, and then rotating the motor in a second opposite direction with an intermittent pulse.

4. The method of claim 3, wherein the motor is repeatedly rotated in the first direction for about 7 seconds, pulsed for about ½ second, rotated in the first direction for about another 7 seconds, deactuated for about 3 seconds, rotated in the second opposite direction for about 7 seconds, pulsed for about ½ second and then rotated in the second direction for about another 7 seconds.

5. The method of claim 1, including actuating the fan during the second knead cycle of step (d) to reduce sour smells and/or vapors in the dough.

6. The method of claim 1, including degassing of the dough of step (f) for a variable period of time corresponding to the type of bread being made.

7. The method of claim 1, including maintaining the temperature during the first bake cycle of step (h) in the range of about 175°–186° C. and maintaining the temperature during the second bake cycle of step (i) in the range of about 145°–155° C.

8. The method of claim 1, further including the step, after the first rise cycle of step (e) and before the degassing of step (f) of preheating the dough to a predetermined temperature higher than the temperature during the first rise cycle of step (e).

9. The method of claim 8, including maintaining the temperature during the first rise cycle of step (e) in the range of about 29°–30° C. for making white, wheat and sweet breads and maintaining the temperature during the second rise cycle of step (g) in the range of about 33°–34° C.

10. The method of claim 8, including maintaining the temperature during the first rise cycle of step (e) in the range of about 23°–24° C. for making french bread and maintaining the temperature during the second rise cycle of step (g) in the range of about 33°–34° C.

11. The method of claim 1, including intermittently actuating the heater and the fan during the cooling cycle of step (j) to control the rate of cooling of the bread.

12. A method for making bread from bread ingredients in a bread maker having a motor driving a kneading blade, a heater and a fan, comprising the sequential steps of:

(a) combining the bread ingredients into a dough;

(b) actuating the motor with intermittent pulses for kneading the dough during a first knead cycle;

(c) deactuating the motor for allowing the dough to rest;

(d) actuating the motor with intermittent pulses for kneading the dough during a second knead cycle;

(e) fermenting the dough during a first rise cycle;

(f) preheating the dough to a predetermined temperature higher than the temperature during the first rise cycle of step (e);

(g) degassing the dough;

(h) fermenting the dough at the higher predetermined temperature of step (f) during a second rise cycle;

(i) baking the bread;

(j) gradually cooling the bread.

13. The method of claim 12, wherein the combining of bread ingredients of step (a) includes repeatedly pulse-actuating the motor.

14. The method of claim 12, wherein the kneading of steps (b) and (d) includes repeatedly rotating the motor, driving the kneading blade in a first direction with an intermittent pulse; deactuating the motor, and then rotating the motor in a second opposite direction with an intermittent pulse.

15. The method of claim 14, wherein the motor is repeatedly rotated in the first direction for about 7 seconds, pulsed for about ½ second, rotated in the first direction for about another 7 seconds, deactuated for about 3 seconds, rotated in the second opposite direction for about 7 seconds, pulsed for about ½ second, and then rotated in the second direction for about another 7 seconds.

16. The method of claim 12, including actuating the fan during the second knead cycle of step (d) to reduce sour smells and/or vapors in the dough.

17. The method of claim 12, including degassing of the dough of step (g) for a variable period of time corresponding to the type of bread being made.

18. The method of claim 12, including maintaining the temperature during the first rise cycle of step (e) in the range of about 29°–30° C. for making white, wheat and sweet breads and maintaining the temperature during the second rise cycle of step (h) in the range of about 33°–34° C.

19. The method of claim 12, including maintaining the temperature during the first rise cycle of step (e) in the range of about 23°–24° C. for making french bread and maintaining the temperature during the second rise cycle of step (h) in the range of about 33°–34° C.

20. The method of claim 12, including intermittently actuating the heater and the fan during the cooling cycle of step (j) to control the rate of cooling of the bread.

21. The method of claim 12, including baking of the bread of step (i) at a temperature for a variable period of time corresponding to a desired bread crust color and then lowering the temperature to complete baking of the bread.

22. A method for making bread from bread ingredients in a bread maker having a motor driving a kneading blade, a heater and a fan, comprising the sequential steps of:

(a) combining the bread ingredients into a dough;

(b) actuating the motor for kneading the dough during a knead cycle;

(c) fermenting the dough during a first rise cycle;

(d) preheating the dough to a predetermined temperature higher than the temperature during the first rise cycle of step (c);

(e) degassing the dough;

(f) fermenting the dough at the higher predetermined temperature of step (d) during a second rise cycle;

(g) baking the bread at a predetermined first bake temperature during a first bake cycle extending for a variable period of time corresponding to a desired bread crust color;

(h) baking the bread at a temperature lower than the first bake temperature during a second bake cycle;

(i) gradually cooling the bread from the second bake cycle temperature.

23. The method of claim 22, wherein the combining of bread ingredients of step (a) includes repeatedly pulse-actuating the motor.

24. The method of claim 22, including degassing of the dough of step (e) for a variable period of time corresponding to the type of bread being made.

25. The method of claim 22, including maintaining the temperature during the first bake cycle of step (g) in the range of about 175°–186° C. and maintaining the temperature during the second bake cycle of step (h) in the range of about 145°–155° C.

26. The method of claim 22, including maintaining the temperature during the first rise cycle of step (c) in the range of about 29°–30° C. for making white, wheat and sweet breads and maintaining the temperature during the second rise cycle of step (f) in the range of about 33°–34° C.

27. The method of claim 22, including maintaining the temperature during the first rise cycle of step (c) in the range of about 23°–24° C. for making french bread and maintaining the temperature during the second rise cycle of step (f) in the range of about 33°–34° C.

28. The method of claim 22, including intermittently actuating the heater and the fan during the cooling cycle of step (i) to control the rate of cooling of the bread.

29. The method of claim 22, including kneading of the dough during the knead cycle of step (b) by repeatedly rotating the motor, driving the kneading blade in one direction with an intermittent pulse, deactuating the motor, and then rotating the motor in the opposite direction with an intermittent pulse.

30. A method for making bread from bread ingredients in a bread maker having a motor driving a kneading blade, a heater and a fan, comprising the sequential steps of:

(a) combining the bread ingredients into a dough;

(b) actuating the motor with intermittent pulses for kneading the dough during a first knead cycle;

(c) deactuating the motor for allowing the dough to rest;

(d) actuating the motor with intermittent pulses for kneading the dough and actuating the fan to reduce sour smells and/or vapors in the dough during a second knead cycle;

(e) fermenting the dough during a first rise cycle;

(f) preheating the dough to a predetermined temperature higher than the temperature during the first rise cycle of step (e);

(g) degassing the dough;

(h) fermenting the dough at the higher predetermined temperature of step (f) during a second rise cycle;

(i) baking the bread at a predetermined first bake temperature during a first bake cycle extending for a variable period of time corresponding to a desired bread crust color;

(j) baking the bread at a temperature lower than the first bake temperature during a second bake cycle;

(k) gradually cooling the bread from the second bake cycle temperature, including intermittently actuating the heater and fan to control the rate of cooling of the bread.

31. The method of claim 30, wherein the combining of bread ingredients of step (a) includes repeatedly pulse-actuating the motor.

32. The method of claim 30, wherein the pulse kneading of steps (b) and (d) includes repeatedly rotating the motor, driving the kneading blade in a first direction with an intermittent pulse, deactuating the motor, and then rotating the motor in a second opposite direction with an intermittent pulse.

33. The method of claim 32, wherein the motor is repeatedly rotated in the first direction for about 7 seconds, pulsed for about ½ second, rotated in the first direction for about another 7 seconds, deactuated for about 3 seconds, rotated in the second opposite direction for about 7 seconds, pulsed for about ½ second and then rotated in the second direction for about another 7 seconds.

34. The method of claim 30, including degassing of the dough of step (g) for a variable period of time corresponding to the type of bread being made.

35. The method of claim 30, including maintaining the temperature during the first bake cycle of step (i) in the range of about 175°–186° C. and maintaining the temperature during the second bake cycle of step (j) in the range of about 145°–155° C.

36. The method of claim 30, including maintaining the temperature during the first rise cycle of step (e) in the range of about 29°–30° C. for making white, wheat and sweet breads and maintaining the temperature during the second rise cycle of step (h) in the range of about 33°–34° C.

37. The method of claim 30, including maintaining the temperature during the first rise cycle of step (e) in the range of about 23°–24° C. for making french bread and maintaining the temperature during the second rise cycle of step (h) in the range of about 33°–34° C.

* * * * *